United States Patent
Steinmetz et al.

(10) Patent No.: US 11,995,235 B2
(45) Date of Patent: May 28, 2024

(54) HUMAN INTERFACE SYSTEM

(71) Applicant: NextMind SAS, Paris (FR)

(72) Inventors: Nelson Steinmetz, Paris (FR); Sid Kouider, Paris (FR); Robin Zerafa, Paris (FR)

(73) Assignee: SNAP INC., Santa Monica, CA (US)

( * ) Notice: Subject to any disclaimer, the term of this patent is extended or adjusted under 35 U.S.C. 154(b) by 8 days.

(21) Appl. No.: 17/758,323

(22) PCT Filed: Jan. 8, 2021

(86) PCT No.: PCT/EP2021/050277
§ 371 (c)(1),
(2) Date: Jul. 1, 2022

(87) PCT Pub. No.: WO2021/136849
PCT Pub. Date: Jul. 8, 2021

(65) Prior Publication Data
US 2023/0022442 A1     Jan. 26, 2023

Related U.S. Application Data

(60) Provisional application No. 62/956,868, filed on Jan. 3, 2020.

(51) Int. Cl.
*G06F 3/01* (2006.01)
*G06F 3/038* (2013.01)

(52) U.S. Cl.
CPC .............. *G06F 3/015* (2013.01); *G06F 3/013* (2013.01); *G06F 3/017* (2013.01); *G06F 3/038* (2013.01); *G06F 2203/0381* (2013.01)

(58) Field of Classification Search
None
See application file for complete search history.

(56) References Cited

U.S. PATENT DOCUMENTS

2020/0337653 A1* 10/2020 Alcaide .................. A61B 5/369

FOREIGN PATENT DOCUMENTS

| CN | 114902161 A | 8/2022 |
|----|-------------|--------|
| WO | WO-2021136849 A1 | 7/2021 |

OTHER PUBLICATIONS

"International Application Serial No. PCT/EP2021/050277, International Search Report dated Apr. 19, 2021", 4 pgs.
"International Application Serial No. PCT/EP2021/050277, Written Opinion dated Apr. 19, 2021", 7 pgs.

(Continued)

*Primary Examiner* — Christopher J Kohlman
(74) *Attorney, Agent, or Firm* — SCHWEGMAN LUNDBERG & WOESSNER, P.A.

(57) ABSTRACT

A human interface system comprising a physical controller configured to receive input from a user and a brain-computer interface in which visual stimuli are presented such that the intention of the user can be validated. The input data from the physical controller is combined with input data from the brain-computer interface to provide hybrid input which may be used to control one or more external real or computer-generated objects. Method of operating said human interface device.

20 Claims, 8 Drawing Sheets

(56) References Cited

OTHER PUBLICATIONS

Grichnik, Roland, et al., "A VR-Based Hybrid BCI Using SSVEP and Gesture Input", Advances in Databases and Information Systems; [Lecture Notes in Computer Science; Lect.Notes Computer], Springer International Publishing, Cham, (May 16, 2019), 418-429.

Karavas, George K, et al., "A hybrid BMI for control of robotic swarms: Preliminary results", IEEE/RSJ International Conference On Intelligent Robots and Systems (IROS), IEEE, (Sep. 24, 2017), 5065-5075.

Ma, Xinyao, et al., "Combining Brain-Computer Interface and Eye Tracking for High-Speed Text Entry in Virtual Reality", Intelligent User Interfaces, ACM, 2 Penn Plaza, Suite 701NEW YORKNY10121-0701USA, (Mar. 5, 2018), 263-267.

"European Application Serial No. 21700387.0, Response filed Jan. 24, 2023 to Communication pursuant to Rules 161(1) and 162 EPC dated Aug. 15, 2022", 17 pgs.

"Korean Application Serial No. 10-2022-7026457, Office Action dated Aug. 3, 2022", w/ English Translation, 5 pgs.

\* cited by examiner

HUMAN INTERFACE SYSTEM

CROSS-REFERENCE TO RELATED APPLICATIONS

This application is a U.S. national-phase application filed under 35 U.S.C. § 371 from International Application Serial No. PCT/EP2021/050277, filed Jan. 8, 2021, and published as WO 2021/136849 on Jul. 8, 2021, which claims the benefit of priority to U.S. Provisional Application Ser. No. 62/956,868, filed Jan. 3, 2020, each of which are incorporated herein by reference in their entireties.

TECHNICAL FIELD OF THE INVENTION

Embodiments of the present disclosure relate to a human interface system incorporating a visual brain-computer interface.

STATE OF THE ART

In visual brain-computer interfaces (BCIs), neural responses to a target stimulus, generally among a plurality of generated visual stimuli presented to the user, are used to infer (or "decode") which stimulus is essentially the object of focus at any given time. The object of focus can then be associated with a user-selectable or -controllable action.

Neural responses may be obtained using a variety of known techniques. One convenient method relies upon surface electroencephalography (EEG), which is non-invasive, has fine-grained temporal resolution and is based on well-understood empirical foundations. Surface EEG makes it possible to measure the variations of diffuse electric potentials on the surface of the skull (i.e. the scalp) of a subject in real-time. These variations of electrical potentials are commonly referred to as electroencephalographic signals or EEG signals.

In a typical BCI, visual stimuli are presented in a display generated by a display device. Examples of suitable display devices (some of which are illustrated in FIG. 3) include television screens & computer monitors 302, projectors 310, virtual reality headsets 306, interactive whiteboards, and the display screen of tablets 304, smartphones, smart glasses 308, etc. The visual stimuli 311, 311',312, 312',314, 314', 316, 318 may form part of a generated graphical user interface (GUI) or they may be presented as augmented reality (AR) or mixed reality graphical objects 316 overlaying a base image: this base image may simply be the actual field of view of the user (as in the case of a mixed reality display function projected onto the otherwise transparent display of a set of smart glasses) or a digital image corresponding to the user's field of view but captured in real time by an optical capture device (which may in turn capture an image corresponding to the user's field of view amongst other possible views).

Inferring which of a plurality of visual stimuli (if any) is the object of focus at any given time is fraught with difficulty. For example, when a user is facing multiple stimuli, such as for instance the digits displayed on an on-screen keypad, it has proven nearly impossible to infer which one is under focus directly from brain activity at a given time. The user perceives the digit under focus, say digit 5, so the brain must contain information that distinguishes that digit from others, but current methods are unable to extract that information. That is, current methods can, with some difficulty, infer that a stimulus has been perceived, but they cannot determine which specific stimulus is under focus using brain activity alone.

To overcome this issue and to provide sufficient contrast between stimulus and background (and between stimuli), it is known to configure the stimuli used by visual BCIs to blink or pulse (e.g. large surfaces of pixels switching from black to white and vice-versa), so that each stimulus has a distinguishable characteristic profile over time). The flickering stimuli give rise to measurable electrical responses. Specific techniques monitor different electrical responses, for example steady state visual evoked potentials (SSVEPs) and P-300 event related potentials. In typical implementations, the stimuli flicker at a rate exceeding 6 Hz. As a result, such visual BCIs rely on an approach that consists of displaying, the various stimuli discretely rather than constantly, and at typically at different points in time. Brain activity associated with attention focused on a given stimulus is found to correspond (i.e. correlate) with one or more aspect of the temporal profile of that stimulus, for instance the frequency of the stimulus blink and/or the duty cycle over which the stimulus alternates between a blinking state and a quiescent state.

Thus, decoding of neural signals relies on the fact that when a stimulus is turned on, it will trigger a characteristic pattern of neural responses in the brain that can be determined from electrical signals, i.e. the SSVEPs or P-300 potentials, picked up by electrodes of an EEG device, the electrodes of an EEG helmet, for example. This neural data pattern might be very similar or even identical for the various digits, but it is time-locked to the digit being perceived: only one digit may pulse at any one time so that the correlation with a pulsed neural response and a time at which that digit pulses may be determined as an indication that that digit is the object of focus. By displaying each digit at different points in time, turning that digit on and off at different rates, applying different duty cycles, and/or simply applying the stimulus at different points in time, the BCI algorithm can establish which stimulus, when turned on, is most likely to be triggering a given neural response, thereby allowing a system to determine the target under focus.

Visual BCIs have improved significantly in recent years, so that real-time and accurate decoding of the user's focus is becoming increasingly practical. Nevertheless, determining the object of focus remains challenging.

Co-pending International Pat. Application number PCT/EP2020/081348 filed on Nov. 6, 2020, the entire specification of which is incorporated herein by reference, describes one approach to the challenge of determining the object of focus (the target) from the objects peripheral to the target (the distractors) with speed and accuracy. This approach relies upon characteristics of the human visual system.

Other techniques are known for determining the object of focus at any given time. It is, for instance, known to track the direction of gaze of the user by tracking changes in the position of the eye of the user relative to their head. This technique typically requires the user to wear a head-mounted device with cameras directed at the user's eyes. In certain instances, of course, the eye tracking cameras may be fixed relative to the floor or a wheelchair, rather than head-mounted. An object found to be positioned in the determined direction of gaze may then be assumed to be the object of focus.

Direction of gaze is, however, considered to be a relatively poor indicator of intention to interact with that object.

In the field of personal computing, many other input mechanics are known for providing computing devices with input from a human. Human interface devices implementing such input mechanics include keyboards, mouse devices, joysticks, touch screens, etc. Human interface devices may be configured to receive: alphanumeric input (as is the case with a conventional computer keyboard and/or a touch screen); point based input (as in components such as mouse, touchpad, trackball, joystick, light pen or other pointing devices); tactile input (e.g., from a physical button or a virtual interface in a touch screen); audio input (e.g., a microphone); and inertial input, amongst other categories of input. The input may be in either analog or digital form. Dedicated controller devices for games consoles, robotic devices and remote control vehicles (such as drones or model cars) may incorporate sensors for obtaining inertial input (e.g. from an inertial measurement unit, IMU) so that the physical movement of the controller device may be translated into input data.

Another category of human interface device may be a device including one or more camera units for camera-based tracking of gestures (for example whole-body gestures, head or hand gestures, or indeed finger gestures made by the user). Camera units in these devices typically operate at visible or infrared wavelengths of electromagnetic radiation. Ultrasonic transducers may replace such camera units in tracking physical gestures. Such devices may be considered as input devices since they too are able to provide computing devices with input from a human. Physical movement of the user, or a part of the user, may be translated into input data.

Each of the conventional input mechanics relies upon manual, physical or vocal input by the human user. For certain users, certain input mechanics may be inconvenient or impossible. For other users, conventional input mechanics may unnecessarily constrain or limit the user's ability to interact with the computer.

It is therefore desirable to provide human interface systems that address the above challenges.

SUMMARY

The present disclosure relates to a human interface system comprising at least one physical controller for receiving input from a user and a brain-computer interface in which visual stimuli are presented such that the intention of the user can be validated, the system being configured to combine input data from the physical controller with input data from the brain-computer interface, thereby offering an improved and intuitive user experience.

According to a first aspect, the present disclosure relates to a human interface system comprising: a physical controller for receiving input from a user; and a brain-computer interface in which at least one visual stimulus is presented, the visual stimulus being generated by a stimulus generator and having a characteristic modulation, such that an object of focus of the user can be determined, the system being configured to combine input data from the physical controller with input data from the brain-computer interface.

According to a second aspect, the present disclosure relates to a method of operation of a human interface system to determine user intention, the method comprising: receiving a first set of input instructions from a user via a physical controller; presenting at least one object in the display of a display device; for one or more of said at least one objects, generating and applying a respective visual stimulus having a corresponding characteristic modulation; receiving electrical signals corresponding to neural responses to the or each stimulus from a neural signal capture device; determining, as a second set of input instructions, which of the objects is an intentional object of focus in accordance with a correlation between the electrical signals and characteristic modulation of the visual stimulus; and combining the first set of input instructions with the second set of input instructions to generate a hybrid set of input instructions.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4A illustrates illustrates two classes of gesture tracking device, while

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 1:
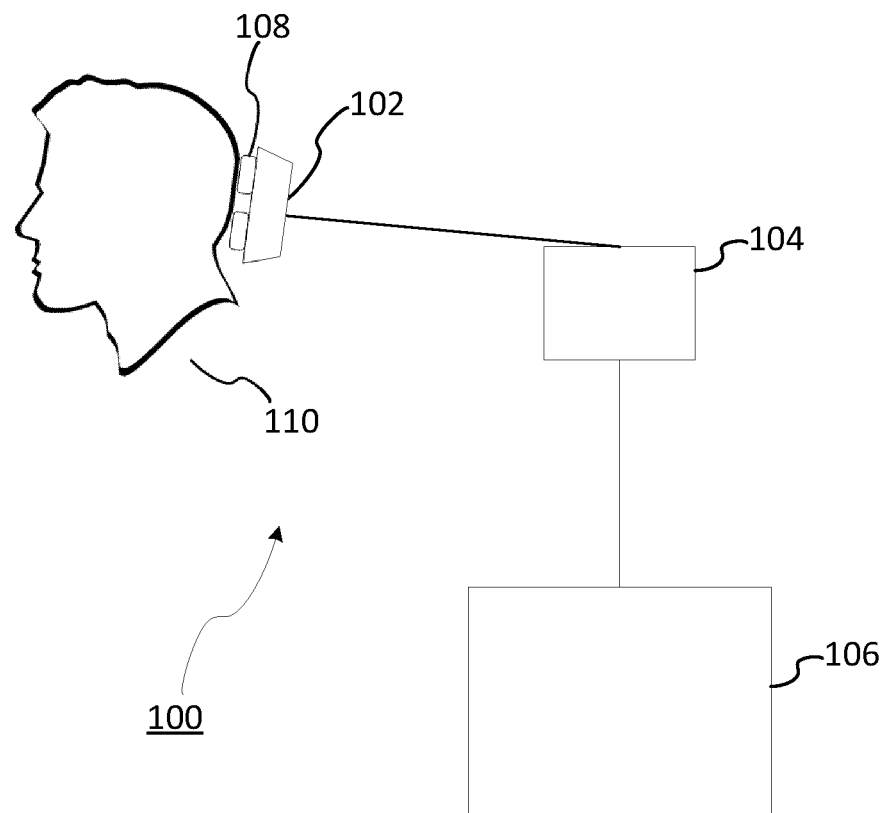
FIG. 1 illustrates an electronic architecture for receiving and processing EEG signals according to the present disclosure.

FIG. 1 illustrates an example of an electronic architecture for the reception and processing of EEG signals by means of an EEG device 100 according to the present disclosure.

To measure diffuse electric potentials on the surface of the skull of a subject 110, the EEG device 100 includes a portable device 102 (i.e. a cap or headpiece), analog-digital conversion (ADC) circuitry 104 and a microcontroller 106. The portable device 102 of FIG. 1 includes one or more electrodes 108, typically between 1 and 128 electrodes, advantageously between 2 and 64, advantageously between 4 and 16.

Each electrode 108 may comprise a sensor for detecting the electrical signals generated by the neuronal activity of the subject and an electronic circuit for pre-processing (e.g. filtering and/or amplifying) the detected signal before analog-digital conversion: such electrodes being termed "active". The active electrodes 108 are shown in use in FIG. 1, where the sensor is in physical proximity with the subject's scalp. The electrodes may be suitable for use with a conductive gel or other conductive liquid (termed "wet" electrodes) or without such liquids (i.e. "dry" electrodes).

Each ADC circuit 104 is configured to convert the signals of a given number of active electrodes 108, for example between 1 and 128.

The ADC circuits 104 are controlled by the microcontroller 106 and communicate with it for example by the protocol SPI ("Serial Peripheral Interface"). The microcontroller 106 packages the received data for transmission to an external processing unit (not shown), for example a computer, a mobile phone, a virtual reality headset, an automotive or aeronautical computer system, for example by Bluetooth, Wi-Fi ("Wireless Fidelity") or Li-Fi ("Light Fidelity").

In certain embodiments, each active electrode 108 is powered by a battery (not shown in FIG. 1). The battery is conveniently provided in a housing of the portable device 102.

In certain embodiments, each active electrode 108 measures a respective electric potential value from which the potential measured by a reference electrode (Ei=Vi−Vref) is subtracted, and this difference value is digitized by means of the ADC circuit 104 then transmitted by the microcontroller 106.

In certain embodiments, the method of the present disclosure introduces target objects for display in a graphical user interface of a display device. The target objects include control items and the control items are in turn associated with user-selectable actions.

Figure 2:
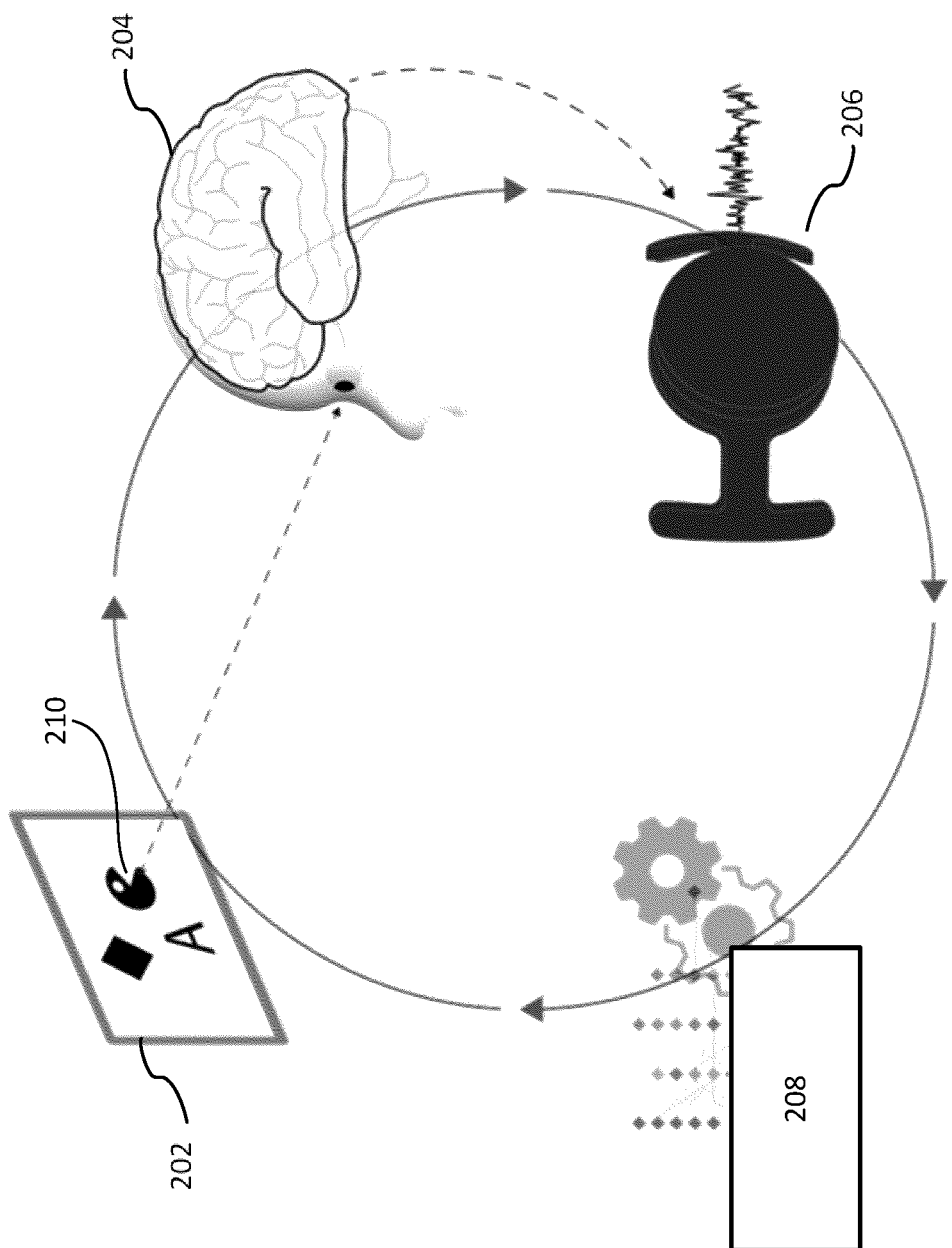
FIG. 2 illustrates a system incorporating a brain computer interface (BCI) according to the present disclosure.
Figure 3:
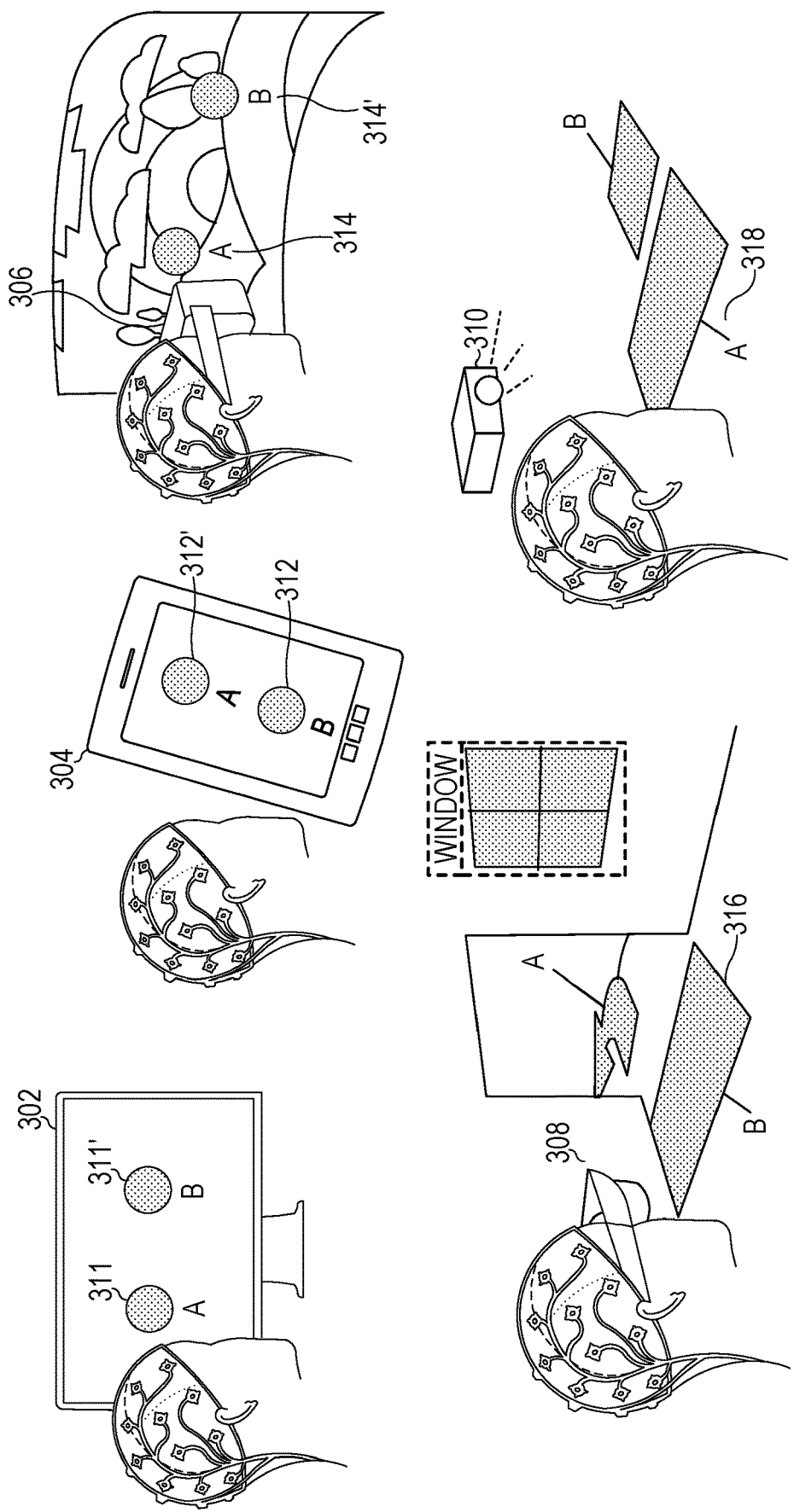
FIG. 3 illustrates various examples of display device suitable for use with the BCI system of the present disclosure.

FIG. 2 illustrates a system incorporating a brain computer interface (BCI) according to the present disclosure. The system incorporates a neural response device 206, such as the EEG device 100 illustrated in FIG. 1. In the system, an image is displayed on a display of a display device 202. The subject 204 views the image on the display, focusing on a target object 210.

In an embodiment, the display device 202 displays at least the target object 210 as a graphical object with a varying temporal characteristic distinct from the temporal characteristic of other displayed objects and/or the background in the display. The varying temporal characteristic may be, for example, a constant or time-locked flickering effect altering the appearance of the target object at a rate greater than 6 Hz. Where more than one graphical object is a potential target object (i.e. where the viewing subject is offered a choice of target object to focus attention on), each object is associated with a discrete spatial and/or temporal code.

The neural response device 206 detects neural responses (i.e. tiny electrical potentials indicative of brain activity in the visual cortex) associated with attention focused on the target object; the visual perception of the varying temporal characteristic of the target object(s) therefore acts as a stimulus in the subject's brain, generating a specific brain response that accords with the code associated with the target object in attention. The detected neural responses (e.g. electrical potentials) are then converted into digital signals and transferred to a processing device 208 for decoding. Examples of neural responses include visual evoked potentials (VEPs), which are commonly used in neuroscience research. The term VEPs encompasses conventional SSVEPs, as mentioned above, where stimuli oscillate at a specific frequency and other methods such as the code-modulated VEP, stimuli are subject to a variable or pseudo-random temporal code. The sympathetic neural response, where the brain appears to "oscillate" or respond in synchrony with the flickering temporal characteristic is referred to herein as "neurosynchrony".

The processing device 208 executes instructions that interpret the received neural signals to determine feedback indicating the target object having the current focus of (visual) attention in real time. Decoding the information in the neural response signals relies upon a correspondence between that information and one or more aspect of the temporal profile of the target object (i.e. the stimulus).

In certain embodiments, the processing device may conveniently generate the image data presented on the display device 202 including the temporally varying target object.

The feedback may conveniently be presented visually on the display screen. For example, the display device may display an icon, cursor, crosshair or other graphical object or effect in close proximity to the target object, highlighting the object that appears to be the current focus of visual attention. Clearly, the visual display of such feedback has a reflexive cognitive effect on the perception of the target object, amplifying the brain response.

Research into the way in which the human visual sensing operates has shown that, when peering at a screen with multiple objects and focusing on one of those objects, the human visual system will be receptive to both high spatial frequencies (HSF) and low spatial frequencies (LSF). Evidence shows that the human visual system is primarily sensitive to the HSF components of the specific display area being focused on (e.g. the object the user is staring at). For peripheral objects, conversely, the human visual system is primarily sensitive to their LSF components. In other words, the neural signals picked up will essentially be impacted by both the HSF components from the target under focus and the LSF components from the peripheral targets. However, since all objects evoke some proportion of both HSF and LSF, processing the neural signals to determine the focus object can be impeded by the LSF noise contributed by peripheral objects. This tends to make identifying the object of focus less accurate and less timely.

As the human visual system is tuned to process parallel multiple stimuli at different locations of the visual field, typically unconsciously, peripheral object stimuli will continue triggering neural responses in the users' brains, even if they appear in the periphery of the visual field. As a result, this poses competition among multiple stimuli and renders the specific neural decoding of the object of focus (the target) more difficult.

Co-pending International patent application number PCT/EP2020/081348 describes one approach where a plurality of objects is displayed in such a way that each one is separated into a version composed only of the LSF components of the object and a version composed of only HSF components. The blinking visual stimulus used to elicit a decodable neural response is conveyed only through the HSF version of the object. The blinking HSF version is superimposed on the LSF version (which does not blink).

The various implementations of BCI described above may each be used to extend, amplify, or accelerate control over external objects (whether real-world or virtual objects in a display). In this sense, certain embodiments of the present disclosure provide an extra modality for control over external objects analogous in user experience to a new tool or even a third arm.

In a first exemplary embodiment, a computer game is controlled by a user with a gamepad controller. The user's input instructions received from the gamepad controller are converted into control commands over a game sprite (or avatar). In addition, the user wears a headset from a brain-computer interface as described above.

Certain elements of the virtual environment of the game sprite are configured to exhibit a respective visual stimulus having a corresponding characteristic modulation (as described above). Electrical signals corresponding to neural responses to the or each stimulus from a neural signal capture device of the BCI so that it can be determined which of the objects is an intentional object of focus (by identifying which of the characteristic modulations has the strongest correlation to the received neural responses). The control over the game sprite is altered according to the further layer of instructions determined via the BCI. For example, the elements exhibiting visual stimuli may, when validated as focal objects, unlock a special power or alter a parameter in the game's physics engine, (e.g. controlling the presence or direction of gravity, the passage of "game time", simulated temperature, friction etc.). Such hybrid control may be used as an additional game control (helping the user progress in the game, say) or as an enabling mechanic unlocking new portions of a game map or altering behaviors of the sprite, mobile objects or the game environment, etc.

As such, the combination of inputs from physical controller and BCI may be applied to different elements of the game application in parallel where such a combination of inputs would be impractical for a single user through other input devices. Furthermore, input from one of the BCI and the physical controller may be used to select a given element with input from the other of the two input means used to confirm (i.e. validate) that selection. The inputs may therefore be applied to serial events associated with a particular game element or display location (e.g. select/validate) and/or with parallel (i.e. near-simultaneous) events at different locations or elements of the game display. The term "combine" used herein encompasses both spatial and temporal combinations of inputs.

This same example also illustrates that the user of the BCI need not be the same as the user of the gamepad controller (or other physical controller). Thus, a game or user experience can be made accessible (e.g. playable) by a novice user with the apparently invisible control of another user (a parent or teacher, for instance). Consider a scenario where an "enemy" sprite (i.e. a computer-controlled game "character") may be "destroyed" by input instructions from the BCI before it attacks the gamepad user or where the actions of the BCI user may levitate a block to allow the gamepad user's sprite to pass. In a further illustrative scenario, the BCI user may surreptitiously select the novice user's next target, simplifying gameplay or guiding learning. The gamepad user may be assisted without being aware of the "god-like" intervention of the BCI user.

In a further exemplary embodiment, a user of an image editing suite (i.e. a computer application for displaying images and facilitating the processing of the image to adjust the appearance of part or all of the image data) may manually operate a pointing device (such as a mouse device or digital stylus) while being able to select an ink color (brush thickness, pen effect, etc.) directly with his mind (through the use of the BCI). The color selection etc. may be effected through the application of visual stimuli (of the type described in detail above) in respective regions of the color palette and the determination of the region inducing the greatest neural response.

In certain embodiments, BCI input (i.e. the input of instructions by a user via the BCI and visual stimuli associated with different regions of the display) may relate to tasks that may also be performed using input from the pointing device. Examples include: navigating the user's cursor within an image for editing; and validating the selection of a portion of the image (in a "cut and paste" mechanic, say). Input from the BCI may be associated with navigation at a different scale from pointing device input so that the input from the BCI may be a convenient alternative to input from the pointing device: BCI input may be associated with larger scale transitions (e.g. between regions, layers, windows or even displays within the image editing suite) while pointing device input may be reserved for finer navigation or other image editing tasks (e.g. pixel-by-pixel movement of the displayed image, outlining of image portions for selection, etc.).

With the co-operation of physical input (such as gamepad input or pointing device input) and BCI input, it is possible to perform conventional tasks more swiftly and intuitively, as validation of a selection or navigation command may be achieved more rapidly and with greater certainty.

In yet another exemplary embodiment, a user may supplement the functionality of a physical input device (keyboard, mouse, touchpad, etc.) when interacting with the operating system of a computing device. The task of navigating to, and selecting, a folder, executable or file may be accelerated with no loss of accuracy by combining the physical input (such as the pressing of buttons/keys) to pinpoint and open a folder or file and BCI input to validate that action.

Figure 4A:
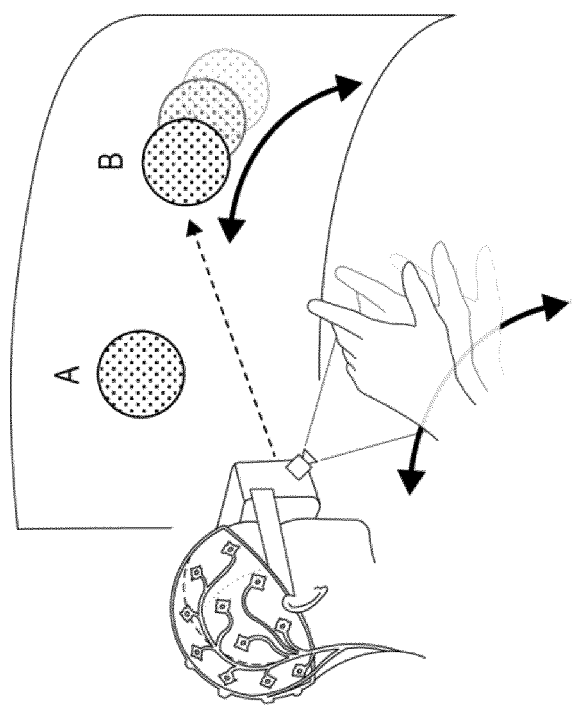
Figure 4A:
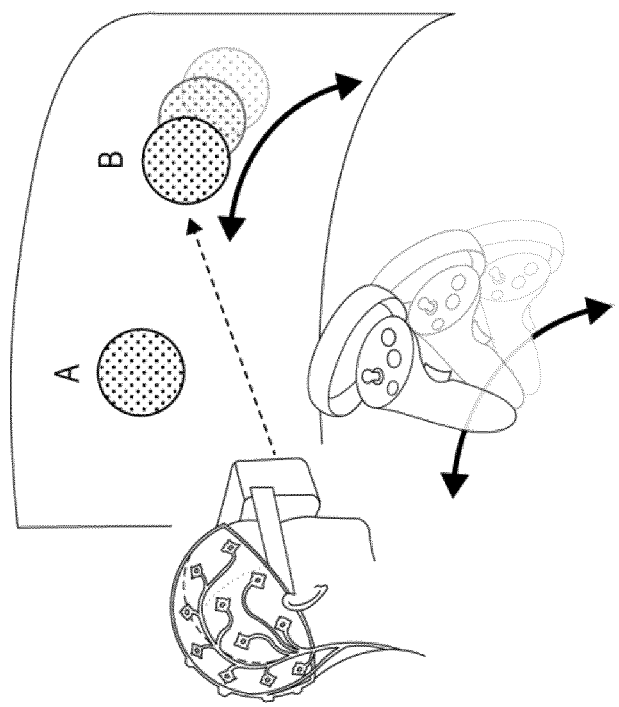

In a further exemplary embodiment, a visual BCI is used together with input from a gesture tracking device. FIG. 4A illustrates two classes of gesture tracking device: on the left-hand side, gesture tracking is through a motion sensitive physical hand controller; whereas on the right-hand side, gestures are detected in an image capture device (such as a forward facing camera or ultrasound transducer embedded in a virtual reality headset). Such arrangements can take full advantage of (and even enhance) the neuro-feedback loop. In this embodiment, a user focuses on an object, for instance a virtual 3D object in a virtual reality environment. By generating small movements with a physical hand controller (as on the left-hand side of FIG. 4A) such as a VR controller or by simply making hand gestures that are tracked in a camera (as on the right-hand side of FIG. 4A) the 3D object can be configured to react accordingly. The degree of visible reaction of the object may in turn be used to assess how well the system detects focus upon the object. This adds degrees of freedom to the feedback loop and progressively builds up alignment between the mind (i.e. neurosychrony), the body and the object in space. Such a neuro-feedback loop could only be visualized by incorporating motor action, fully including body movement, into the feedback loop, increasing engagement and improving the experience synthesis.

Similarly, simultaneous input modalities (where gesture tracking is used in conjunction with visual BCI) may be applied to mixed reality, XR, environments. For instance, the input modalities may co-operate to allow the user to snap their hand pointer to center on an interactive button based on the user's inferred object of focus: this would be an improvement on the need for the user to place and/or move their arm (indicating a virtual "cursor-line" in space) where this may be inconvenient, uncomfortable or even physically impossible for the user. Such problems also occur, to a lesser extent, with regular mouse pointers.

Furthermore, the requirement for the validation of a command using input from the BCI adds a layer of security. For a validation to take place, the user must be operating the BCI correctly. In the teacher/parent scenario, certain actions may be blocked without the additional input from the user of the BCI: accidental input by the inexperience novice can be rendered ineffective. Likewise, where the physical controller and BCI are each used by the same user, signals from the physical controller may be blocked in the absence of attention from the user (as determined by the BCI).

Users of the above described human interface system, may include users who might struggle to operate conventional input devices or BCI devices alone, such as the inexperienced game pad user.

One consequence of the use of the human interface system as described above, is the reduction in energy required to achieve certain tasks (as a result of the more efficient navigation and/or performance of complex tasks).

Figure 4B:
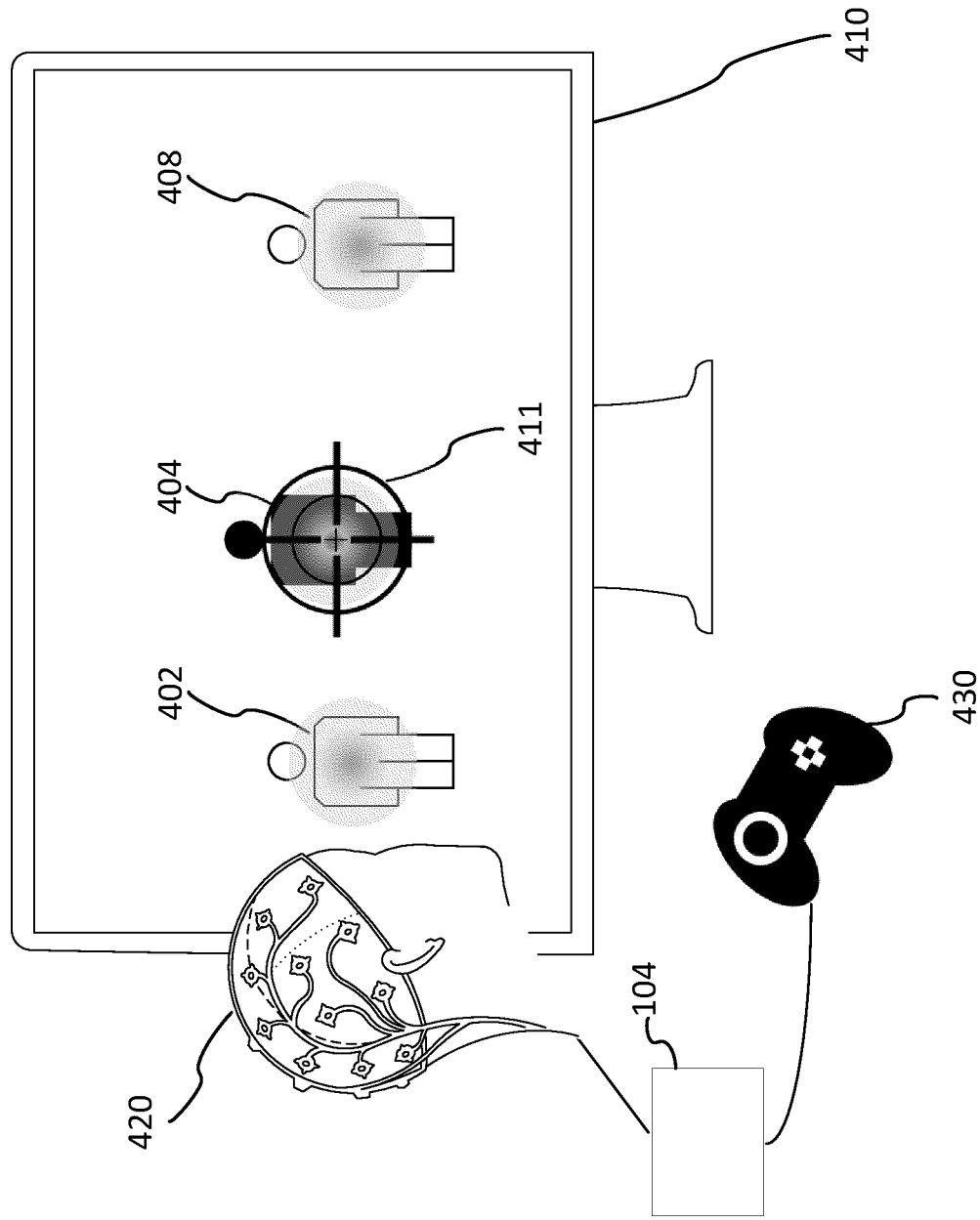
FIG. 4B shows a human interface system in accordance with the present disclosure.

FIG. 4B shows a human interface system 400 in accordance with the present disclosure. The system includes a physical controller 430 and a brain computer interface 420 (such as the BCI of FIG. 2 with conversion circuitry 104 and a microcontroller (not shown) all in communication with an external processing unit (also not shown)). Both input devices provide input that is applied to a display 410 outputting a graphical interface of a computer application or game.

The user here controls both the physical controller 430 (e.g. a gamepad) and the BCI. Thus, the selection of the target 404 from amongst other objects 402, 408 by manipulation of the gamepad 430 may be confirmed (i.e. validated) by the use of the BCI. The user selection and confirmation are visually indicated in a familiar way by the superposition of a 'crosshair' visual element 411.

Figure 5:
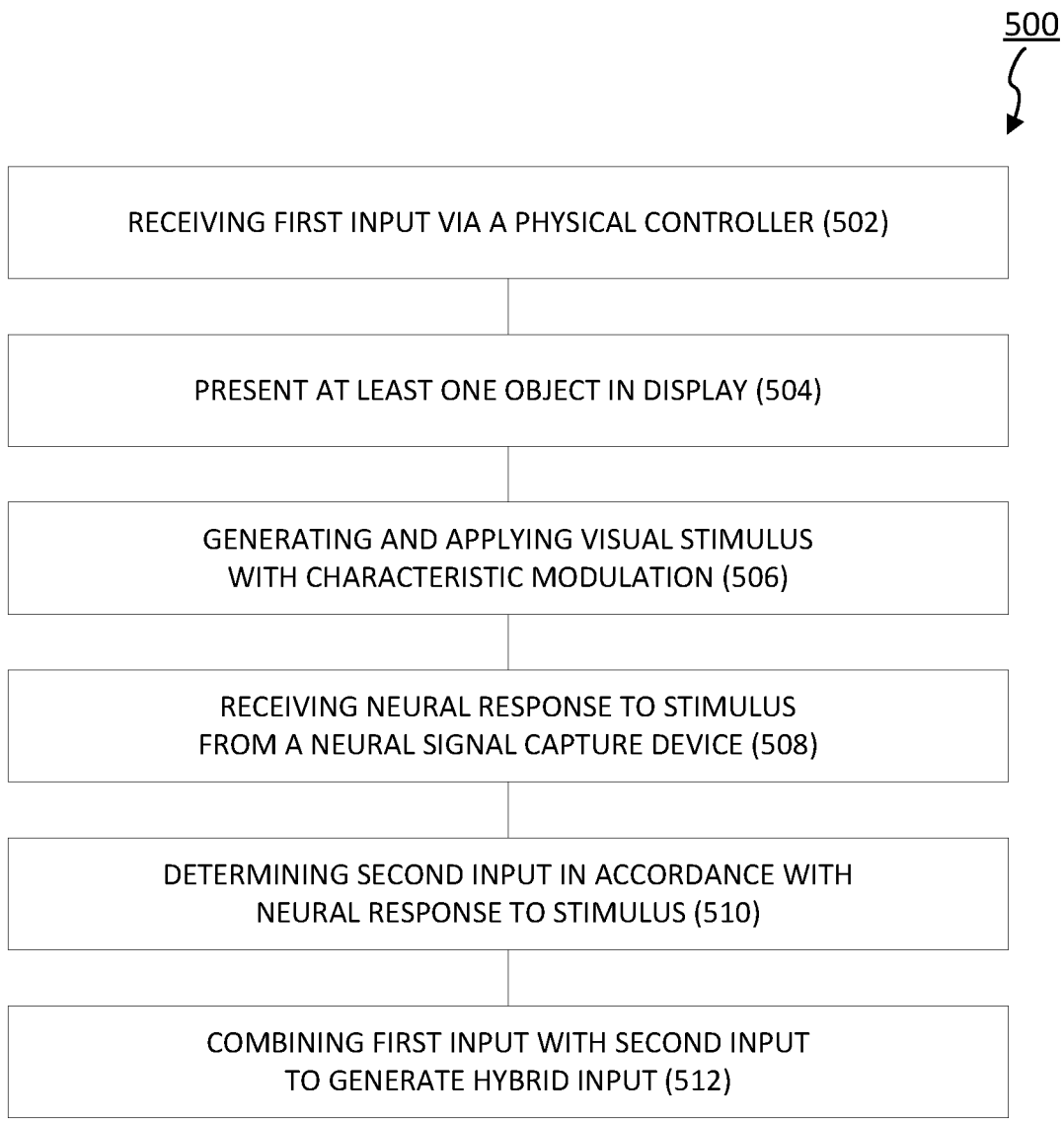
FIG. 5 illustrates the main functional blocks in the method of operation of a human interface system in accordance with the present disclosure.

FIG. 5 illustrates the main functional blocks in the method of operation 500 of a human interface system (for example, the human interface system illustrated in FIG. 4B) in accordance with the present disclosure.

In block 502, a hardware interfacing device (operatively coupled to a physical controller and a brain computer interface device) receives a first set of input instructions from a user via the physical controller.

In block 504, the interfacing device causes the presentation of at least one object in a display of a display device.

In block 506, the interfacing device generates and applies a respective visual stimulus having a corresponding characteristic modulation for one or more of the at least one objects.

In block 508, the interfacing device receives electrical signals corresponding to neural responses to the or each stimulus from a neural signal capture device (such as the BCI of FIG. 4B).

In block 510, the interfacing device determines which of the at least one objects is an intentional object of focus in accordance with a correlation between the electrical signals and characteristic modulation of the visual stimulus, the outcome of said determination being used as a second set of input instructions.

In block 512, the interfacing device combines the first set of input instructions with the second set of input instructions to generate a hybrid set of input instructions.

As the reader will readily appreciate, the order of performance of the above functional blocks may vary. For instance, the generation and application of visual stimuli for one or more objects may take place before the receipt of the first set of input instructions from the user via the physical controller.

The combination of the first and second set of input instructions may include a combination of instructions relating to a single element at a single spatial location (in a computer-generated graphical interface) and/or to elements at different spatial locations at substantially the same time.

Figure 6:
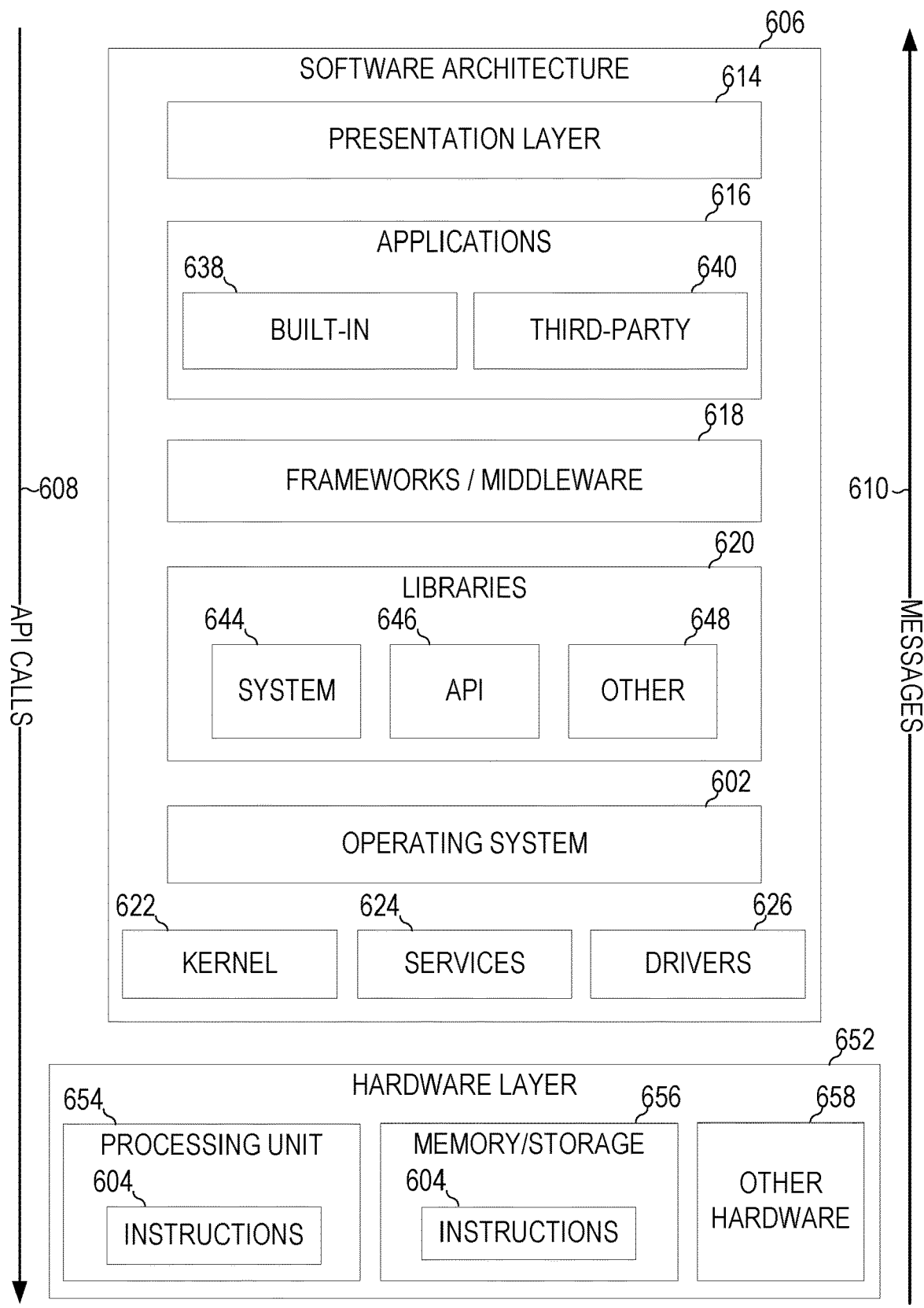
FIG. 6 is block diagram showing a software architecture within which the present disclosure may be implemented, in accordance with some example embodiments.

FIG. 6 is a block diagram illustrating an example software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 706, and input/output (I/O) components 718. A representative hardware layer 652 is illustrated and can represent, for example, the machine 700 of FIG. 7. The representative hardware layer 652 includes a processing unit 654 having associated executable instructions 604. The executable instructions 604 represent the executable instructions of the software architecture 606, including implementation of the methods, modules and so forth described herein. The hardware layer 652 also includes memory and/or storage modules shown as memory/storage 656, which also have the executable instructions 604. The hardware layer 652 may also comprise other hardware 658, for example dedicated hardware for interfacing with EEG electrodes, for interfacing with eye tracking units and/or for interfacing with display devices.

In the example architecture of FIG. 6, the software architecture 606 may be conceptualized as a stack of layers where each layer provides particular functionality. For example, the software architecture 606 may include layers such as an operating system 602, libraries 620, frameworks or middleware 618, applications 616 and a presentation layer 614. Operationally, the applications 616 and/or other components within the layers may invoke application programming interface (API) calls 608 through the software stack and receive a response as messages 610. The layers illustrated are representative in nature and not all software architectures have all layers. For example, some mobile or special purpose operating systems may not provide the frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 may be responsible for controlling or interfacing with the underlying hardware. For instance, the drivers 626 may include display drivers, EEG device drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 may provide a common infrastructure that may be used by the applications 616 and/or other components and/or layers. The libraries 620 typically provide functionality that allows other software modules to perform tasks in an easier fashion than by interfacing directly with the underlying operating system 602 functionality (e.g., kernel 622, services 624, and/or drivers 626). The libraries 620 may include system libraries 644 (e.g., C standard library) that may provide functions such as memory allocation functions, string manipulation functions, mathematic functions, and the like. In addition, the libraries 620 may include API libraries 646 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks 618 (also sometimes referred to as middleware) provide a higher-level common infrastructure that may be used by the applications 616 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be used by the applications 616 and/or other software components/modules, some of which may be specific to a particular operating system or platform.

The applications 616 include built-in applications 638 and/or third-party applications 640.

The applications 616 may use built-in operating system functions (e.g., kernel 622, services 624, and/or drivers 626), libraries 620, or frameworks/middleware 618 to create user interfaces to interact with users of the system. Alternatively, or additionally, in some systems interactions with a user may occur through a presentation layer, such as the presentation layer 614. In these systems, the application/module "logic" can be separated from the aspects of the application/module that interact with a user.

Figure 7:
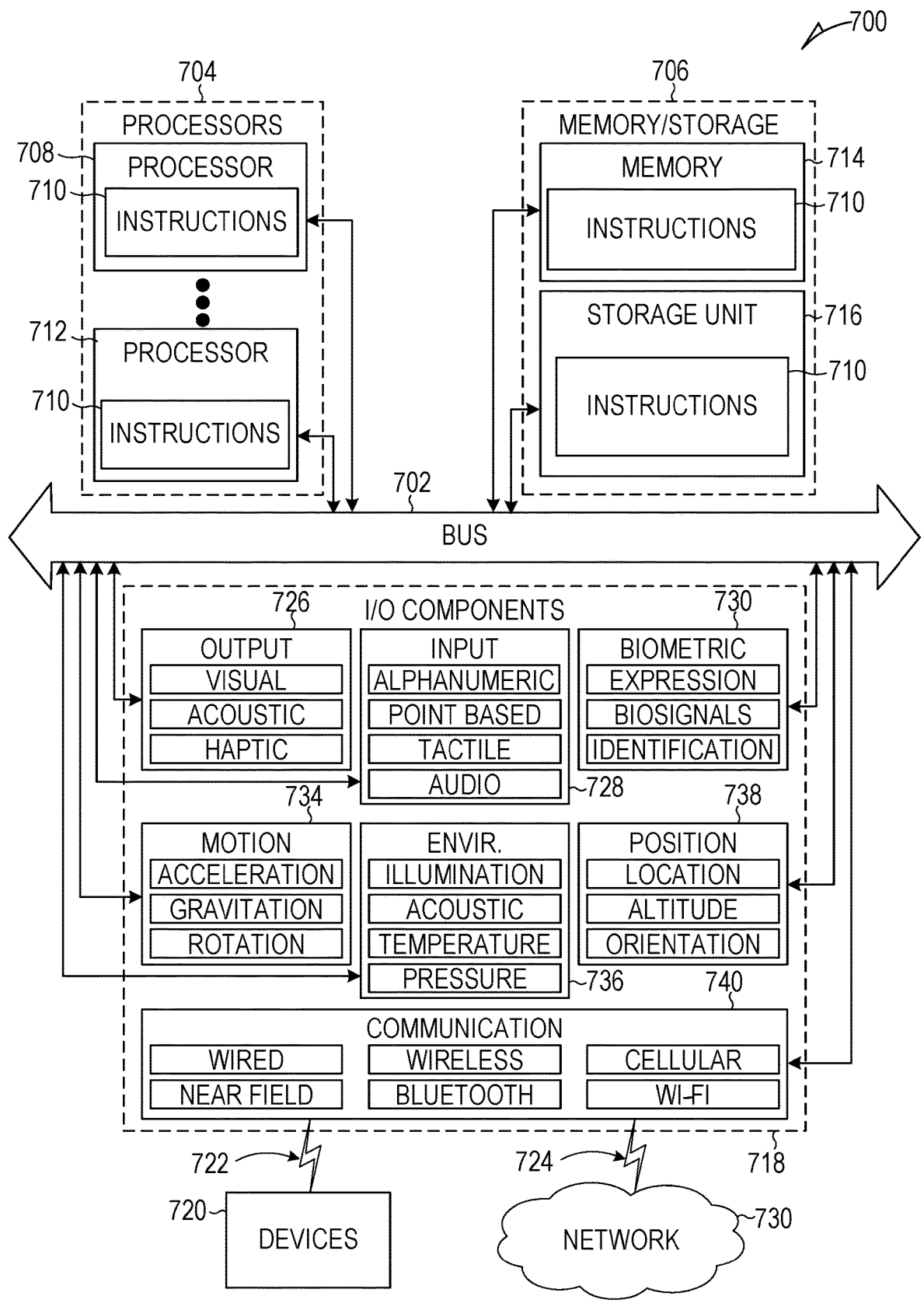
FIG. 7 is a diagrammatic representation of a machine, in the form of a computer system within which a set of instructions may be executed for causing the machine to perform any one or more of the methodologies discussed, in accordance with some example embodiments.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory 706, and input/output (I/O) components 718, which may be configured to communicate with each other such as via a bus 702. In an example embodiment, the processors 704 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 708 and a processor 712 that may execute the instructions 710. The term "processor" is intended to include multi-core processor that may comprise two or more independent processors (sometimes referred to as "cores") that may execute instructions contemporaneously. Although FIG. 7 shows multiple processors, the machine 700 may include a single processor with a single core, a single processor with multiple cores (e.g., a multi-core processor), multiple processors with a single core, multiple processors with multiples cores, or any combination thereof.

The memory 706 may include a memory 714, such as a main memory, a static memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 710. The term "machine-readable medium" shall also be taken to include any medium, or combination of multiple media, that is capable of storing instructions (e.g., instructions 710) for execution by a machine (e.g., machine 700), such that the instructions, when executed by one or more processors of the machine 700 (e.g., processors 704), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 718 may include a wide variety of components to receive input, provide output, produce output, transmit information, exchange information, capture measurements, and so on. The specific input/ output (I/O) components 718 that are included in a particular machine will depend on the type of machine. For example, user interface machines and portable machines such as mobile phones will likely include a touch input device or other such input mechanisms, while a headless server machine will likely not include such a touch input device. It will be appreciated that the input/output (I/O) components 718 may include many other components that are not shown in FIG. 7.

The input/output (I/O) components 718 are grouped according to functionality merely for simplifying the following discussion and the grouping is in no way limiting. In various example embodiments, the input/output (I/O) components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the input/output (I/O) components 718 may include biometric components 730, motion components 734, environment components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves, such as the output from an EEG device), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental environment components 736 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 738 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 718 may include communication components 740 operable to couple the machine 700 to a network 732 or devices 720 via a coupling 724 and a coupling 722 respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)). Where an EEG device, an eye tracking unit or a display device is not integral with the machine 700, the device 720 may be an EEG device, an eye tracking unit and/or a display device.

Although described through a number of detailed exemplary embodiments, the portable devices for the acquisition of electroencephalographic signals according to the present disclosure comprise various variants, modifications and improvements which will be obvious to those skilled in the art, it being understood that these various variants, modifications and improvements fall within the scope of the subject of the present disclosure, as defined by the following claims.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Thus, the present disclosure describes a system and method for improving the accuracy, speed performance and visual comfort of BCIs.

EXAMPLES

To better illustrate the system and methods disclosed herein, a non-limiting list of examples is provided here:
1. A human interface system comprising:
    a physical controller for receiving input from a user; and
    a brain-computer interface in which at least one visual stimulus is presented, the visual stimulus being generated by a stimulus generator and having a characteristic modulation, such that an object of focus of the user can be determined,
    wherein the system is configured to combine input data from the physical controller with input data from the brain-computer interface.
2. A method of operation of a human interface system to determine user intention, the method comprising:
    receiving a first set of input instructions from a user via a physical controller;
    presenting at least one object in the display of a display device;
    for one or more of said at least one objects, generating and applying a respective visual stimulus having a corresponding characteristic modulation;
    receiving electrical signals corresponding to neural responses to the or each stimulus from a neural signal capture device;
    determining, as a second set of input instructions, which of the objects is an intentional object of focus in accordance with a correlation between the electrical signals and characteristic modulation of the visual stimulus; and
    combining the first set of input instructions with the second set of input instructions to generate a hybrid set of input instructions.
3. The method of example 2, wherein the operation of combining the first set of input instructions with the second set of input instructions includes:
    applying the first set of input instructions to a first element in a graphical output of a computer-generated application; and
    simultaneously applying the second set of input instructions to a second element in the graphical output.
4. The method of example 2, wherein the operation of combining the first set of input instructions with the second set of input instructions includes:
    applying the first set of input instructions to a third element in a graphical output of a computer-generated application as a selection operation; and
    applying the second set of input instructions to the third element as a validation operation.
5. The method of example 2, wherein the object of focus is associated with a controllable object, the method further comprising:
    transmitting a command to the controllable object corresponding to the hybrid input, thereby controlling said controllable object to implement an action based on said command.
6. A computer-readable storage medium, the computer-readable storage medium carrying instructions that, when executed by a computer, cause the computer to perform operations comprising:
    receiving a first set of input instructions from a user via a physical controller;
    presenting at least one object in the display of a display device;
    for one or more of said at least one objects, generating and applying a respective visual stimulus having a corresponding characteristic modulation;
    receiving electrical signals corresponding to neural responses to the or each stimulus from a neural signal capture device;
    determining, as a second set of input instructions, which of the objects is an intentional object of focus in accordance with a correlation between the electrical signals and characteristic modulation of the visual stimulus; and
    combining the first set of input instructions with the second set of input instructions to generate a hybrid set of input instructions.

What is claimed is:
1. A human interface system comprising:
    a physical controller for receiving input from a user, the physical controller comprising a pointer device manipulated by the user; and
    a brain-computer interface in which at least one visual stimulus is presented, the visual stimulus being generated by a stimulus generator and having a characteristic modulation, such that an object of focus of the user can be determined,
    wherein the system is configured to combine input data from the physical controller with input data from the brain-computer interface.
2. The human interface system of claim 1, wherein the human interface system is further configured to combine the input data from the physical controller with the input data from the brain-computer interface by performing operations comprising:
    applying the input data from the physical controller to a first element in a graphical output of a computer-generated application; and
    simultaneously applying the input data from the brain-computer interface to a second element in the graphical output.
3. The human interface system of claim 1, wherein the human interface system is further configured to combine the input data from the physical controller with the input data from the brain-computer interface by performing operations comprising:
    applying the input data from the physical controller to an element in a graphical output of a computer-generated application as a selection operation; and
    applying the input data from the brain-computer interface to the element as a validation operation.
4. The human interface system of claim 1,
    wherein the object of focus is associated with a controllable object, and
    wherein the human interface system is further configured to:
        transmit a command to the controllable object corresponding to combined input data from the physical controller and the input data from the brain-computer interface, thereby controlling the controllable object to implement an action based on the command.

5. The human interface system of claim 1, wherein the input data from the brain-computer interface is associated with navigation at a different scale from the input data from the physical controller.

6. A method of operation of a human interface system to determine user intention, the method comprising:
receiving a first set of input instructions from a user via a physical controller, the physical controller comprising a pointer device manipulated by the user;
presenting at least one object in a display of a display device;
for one or more of said at least one objects, generating and applying a respective visual stimulus having a corresponding characteristic modulation;
receiving electrical signals corresponding to neural responses to the or each stimulus from a neural signal capture device;
determining, as a second set of input instructions, which of the objects is an intentional object of focus in accordance with a correlation between the electrical signals and characteristic modulation of the visual stimulus; and
combining the first set of input instructions with the second set of input instructions to generate a hybrid set of input instructions.

7. The method of claim 6, wherein the operation of combining the first set of input instructions with the second set of input instructions includes:
applying the first set of input instructions to a first element in a graphical output of a computer-generated application; and
simultaneously applying the second set of input instructions to a second element in the graphical output.

8. The method of claim 6, wherein the operation of combining the first set of input instructions with the second set of input instructions includes:
applying the first set of input instructions to an element in a graphical output of a computer-generated application as a selection operation; and
applying the second set of input instructions to the element as a validation operation.

9. The method of claim 6, wherein the object of focus is associated with a controllable object, the method further comprising:
transmitting a command to the controllable object corresponding to the hybrid input, thereby controlling said controllable object to implement an action based on said command.

10. The method of claim 6, wherein the second set of input instructions is associated with navigation at a different scale from the first set of input instructions from the physical controller.

11. A computer-readable storage medium, the computer-readable storage medium carrying instructions that, when executed by a computer, cause the computer to perform operations comprising:
receiving a first set of input instructions from a user via a physical controller, the physical controller comprising a pointer device manipulated by the user;
presenting at least one object in a display of a display device;
for one or more of said at least one objects, generating and applying a respective visual stimulus having a corresponding characteristic modulation;
receiving electrical signals corresponding to neural responses to the or each stimulus from a neural signal capture device;
determining, as a second set of input instructions, which of the objects is an intentional object of focus in accordance with a correlation between the electrical signals and characteristic modulation of the visual stimulus; and
combining the first set of input instructions with the second set of input instructions to generate a hybrid set of input instructions.

12. The computer-readable storage medium of claim 11, wherein the instructions that, when executed by the computer, cause the computer to perform operations of combining the first set of input instructions with the second set of input instructions further cause the computer to perform operations comprising:
applying the first set of input instructions to a first element in a graphical output of a computer-generated application; and
simultaneously applying the second set of input instructions to a second element in the graphical output.

13. The computer-readable storage medium of claim 11, wherein the instructions that, when executed by the computer, cause the computer to perform operations of combining the first set of input instructions with the second set of input instructions further cause the computer to perform operations comprising:
applying the first set of input instructions to an element in a graphical output of a computer-generated application as a selection operation; and
applying the second set of input instructions to the element as a validation operation.

14. The computer-readable storage medium of claim 11, wherein the object of focus is associated with a controllable object, and
wherein the instructions, when executed by the computer, further cause the computer to perform operations comprising:
causing the controllable object to implement an action by transmitting a command to the controllable object corresponding to the hybrid input.

15. The computer-readable storage medium of claim 11, wherein the second set of input instructions is associated with navigation at a different scale from the first set of input instructions from the physical controller.

16. A human interface system comprising:
one or more processors; and
a memory storing computer-executable instructions that when executed by the one or more processors cause the one or more processors to perform operations comprising:
receiving a first set of input instructions from a user via a physical controller, the physical controller comprising a pointer device manipulated by the user;
presenting at least one object in a display of a display device;
for one or more of said at least one objects, generating and applying a respective visual stimulus having a corresponding characteristic modulation;
receiving electrical signals corresponding to neural responses to the or each stimulus from a neural signal capture device;
determining, as a second set of input instructions, which of the objects is an intentional object of focus in accordance with a correlation between the electrical signals and characteristic modulation of the visual stimulus; and combining the first set of input instructions with the second set of input instructions to generate a hybrid set of input instructions.

17. The human interface system of claim 16, wherein the instructions that, when executed by the one or more processors, cause the one or more processors to perform operations of combining the first set of input instructions with the second set of input instructions further cause the one or more processors to perform operations comprising:

applying the first set of input instructions to a first element in a graphical output of a computer-generated application; and simultaneously applying the second set of input instructions to a second element in the graphical output.

18. The human interface system of claim 16, wherein the instructions that, when executed by the one or more processors, cause the one or more processors to perform operations of combining the first set of input instructions with the second set of input instructions further cause the one or more processors to perform operations comprising:

applying the first set of input instructions to an element in a graphical output of a computer-generated application as a selection operation; and applying the second set of input instructions to the element as a validation operation.

19. The human interface system of claim 16, wherein the object of focus is associated with a controllable object, and wherein the instructions, when executed by the one or more processors, further cause the one or more processors to perform operations comprising:

causing the controllable object to implement an action by transmitting a command to the controllable object corresponding to the hybrid input.

20. The human interface system of claim 16, wherein the second set of input instructions is associated with navigation at a different scale from the first set of input instructions from the physical controller.

\* \* \* \* \*